(12) United States Patent
Lesage

(10) Patent No.: US 11,988,397 B2
(45) Date of Patent: May 21, 2024

(54) HOT WATER SUPPLY CONTROL SYSTEM AND METHOD FOR DOMESTIC ELECTRIC WATER HEATERS TO PREVENT THE RISK OF BACTERIAL TRANSFER

(71) Applicant: MICLAU-S.R.I. INC., Montreal East (CA)

(72) Inventor: Jean-Claude Lesage, Kirkland (CA)

(73) Assignee: GIANT FACTORIES INC., Montreal (CA)

( * ) Notice: Subject to any disclaimer, the term of this patent is extended or adjusted under 35 U.S.C. 154(b) by 710 days.

(21) Appl. No.: 16/974,288

(22) Filed: Dec. 21, 2020

(65) Prior Publication Data

US 2022/0196249 A1 Jun. 23, 2022

(51) Int. Cl.
*F24D 17/00* (2022.01)
*F24H 9/20* (2022.01)
*G05D 7/06* (2006.01)

(52) U.S. Cl.
CPC ....... *F24D 17/0073* (2013.01); *F24H 9/2021* (2013.01); *G05D 7/0623* (2013.01); *G05D 7/0635* (2013.01); *F24D 2240/243* (2013.01)

(58) Field of Classification Search
CPC ........... F24D 17/0073; F24D 2240/243; F24H 9/2021; G05D 7/0623; G05D 7/0635
USPC ....................................... 392/449, 451, 465
See application file for complete search history.

(56) References Cited

U.S. PATENT DOCUMENTS

| 5,168,546 A * | 12/1992 | Laperriere | F24H 1/185 219/535 |
| 6,242,720 B1 * | 6/2001 | Wilson | H05B 1/0297 219/486 |
| 2006/0013572 A1 * | 1/2006 | Phillips | F24H 15/225 392/459 |
| 2010/0096018 A1 * | 4/2010 | Wylie | F24H 15/335 137/337 |
| 2012/0012198 A1 * | 1/2012 | Schneider | E03B 1/048 137/468 |

* cited by examiner

*Primary Examiner* — Sang Y Paik
(74) *Attorney, Agent, or Firm* — Guy J. Houle; HOULE PATENT AGENCY, INC

(57) ABSTRACT

A hot water temperature sensing cut-off system and method for use with electric water heaters to preclude the flow of unsafe water from the water heater into the hot water distribution conduit to prevent the risk of bacteria transfer in the hot water distribution conduit. One simple solution is to mount a temperature responsive shut-off valve between the hot water supply outlet conduit of the tank of the water heater and the hot water distribution conduit and wherein the valve will shut-off water flow upon detection of an unsafe water temperature below 125 degrees Fahrenheit. Another solution is to use a controller to operate a shut-off valve. A temperature sensor is located to sense the water temperature at the intake of the hot water conduit and feeds a signal to the controller to operate a closure component of the valve to shut-off the hot water supply upon detecting a predetermined low water temperature fed to an inlet end of the control shut-off valve. When the water heats up to a predetermined safe temperature, the controller opens the valve and continues supplying hot water.

6 Claims, 4 Drawing Sheets

HOT WATER SUPPLY CONTROL SYSTEM AND METHOD FOR DOMESTIC ELECTRIC WATER HEATERS TO PREVENT THE RISK OF BACTERIAL TRANSFER

FIELD OF THE INVENTION

The present invention relates to the prevention of bacteria being transmitted in the hot water distribution conduits of domestic electric water heaters and more specifically to a hot water supply cut-off valve for use with electric water heaters to preclude the flow of unsafe water from the water holding tank, of such water heaters, into the hot water distribution conduits to prevent the risk of bacteria transfer, such as the *Legionella* bacteria which can grow and spread in water storage tanks of electric water heaters.

BACKGROUND OF THE INVENTION

There exists a health risk in the hot water supply conduits associated with domestic electric water heaters wherein bacteria, and particularly the *Legionella* bacteria, can develop in the lowermost part of the water holding tank of such water heaters where the temperature of the water is at its lowermost temperature. Also, these water holding tanks are formed with dome-shaped bottom wall and this creates a cavitated circumferential area between the lowermost section of the tank and the dome-shaped bottom wall in which sediments in the water collect over time and can form a culture bed for bacteria to hide and proliferate. According to the Centers for Disease Control and Prevention, USA, between 8,000 and 18,000 people are hospitalized with Legionnaires disease each year. It is of great public concern as its fatality rate during an outbreak ranges from 5% to 30% in those who contract the disease. Actively managing the risk of *Legionella* in water systems is more cost effective than responding to an outbreak. Outbreaks of *Legionella pneumophila* can stem from showers and potable water systems. As water from such sources aerosolized, individuals can inhale the *Legionella* containing droplets and the organism is aspirated into the lungs.

As mentioned above, most electric water heaters for domestic use have their water tank constructed with a dome shaped bottom wall which have a surrounding cavitated zone where sediments deposit can gather and where water is less agitated. This cavitated zone is also spaced from the bottom heating element and thus water therein is less hot which can create an ideal location for bacterial growth. Should the bottom element fail, then the water temperature at the bottom of the tank will drop. It has also been determined, by research, that the *Legionella* bacteria does not survive at temperatures above 130 to 140 degrees F. When hot water is not drawn from a water heater, the water inside the tank becomes stagnant and the water temperature stratifies with the cooler temperature being at the bottom region of the tank. Water within the cavitated zone below the bottom element of the tank can fall to about 85 to 105 degrees F. which is favorable to bacteria growth. It is said to be difficult to increase the temperature at the bottom of the tank when there is no water consumption, that is to say when there is no draw of hot water from the water heater. One solution to the problem is to raise the temperature in the bottom end of the tank by lowering the bottom element closer to the bottom wall. However, lowering the bottom element to place it close to the bottom wall of the tank has not proven to be a viable solution.

The prior art discloses various methods and apparatus to prevent bacteria proliferation in electric water heaters. One method teaches adding a heating element in the form of a belt or patch on the outside surface of the wall of the tank near the bottom end of its side wall to heat the water at the bottom end of the tank to a temperature preferably above 55 degrees C. (130 degrees F.). Accordingly, this proposed solution provides an extra heating element in the form of one or more electrical patch heaters located in an area which is usually filled with insulating foam material and not practical to access should it fail and require replacement or repair. Providing a large access panel for access to such elements is not practical as the expandable foam would cover the elements and if a large foam dam is used then there will be considerable heat loss in the open area of that region. It is not a practical solution and it is also costly and consumes more electricity.

Another proposed solution is to add a third element into the tank to periodically raise the water temperature at the bottom of the tank beyond the pre-set consumption temperature, to a sanitizing temperature to destroy bacteria. This is also a costly proposition. Another proposed method is to direct a cold water flow of all consumed drinking or domestically used water through the lower region of the tank to prevent stagnant water and the formation of deposits for bacteria growth. Accordingly, the lower region of the tank is continuously flushed with fresh water. This is a costly solution requiring a new tank design and a cold water conduit network and therefore also not a viable solution.

SUMMARY OF THE INVENTION

It a feature of the present invention to provide a hot water supply temperature responsive cut-off valve for use with electrical water heaters that allows safe hot water to flow but precludes the flow of unsafe water temperature to a hot water distribution conduit system associated therewith and thereby preventing the risk of bacteria transfer in the hot water distribution conduit system.

A further feature of the present invention is to provide a method for preventing the flow of unsafe water from a water holding tank of an electric water heater and into the hot water distribution conduit system associated therewith.

Another feature of the present invention is to provide a thermostatic cut-off valve secured to the hot water outlet conduit of the water holding tank of an electric water heater and wherein the valve automatically operates a closure member upon detecting a predetermined low water temperature of the hot water flowing there through and into the hot water distribution conduit system.

A further feature of the present invention is to provide a controller which is programmed to operate a shut-off valve secured to the hot water outlet conduit of the water holding tank of an electric water heater upon receiving actual water temperature signals of the water being fed from the top region of the tank to the shut-off valve and determining that the shut-off valve needs to be closed to stop the transfer of hot water which has fallen to a temperature where there is the risk of containing harmful bacteria and further determining when the valve needs to be open to continue the transfer of safe hot water into the hot water distribution conduit system associated therewith.

According to the above features, from a broad aspect, the present invention provides a hot water supply cut-off system for use with an electric water heater to preclude the flow of unsafe water to a hot water distribution conduit system associated therewith to prevent the risk of bacteria transfer to the hot water distribution conduit system. The system comprises an electric water heater having a water holding tank. The water holding tank has a domestic water supply inlet conduit to release water under pressure in a lower portion of the water holding tank. Two or more resistive heating elements are secured to the water holding tank to heat water in an upper and lower region of the tank. A hot water supply outlet conduit is secured to the upper portion of the tank to supply hot water to the hot water distribution conduit system. A temperature responsive shut-off valve has an inlet end thereof secured to the hot water supply outlet conduit. The temperature responsive shut-off valve has an outlet end secured to the hot water distribution conduit. The temperature responsive valve has a closure component which automatically closes upon detecting a predetermined low water temperature fed to the inlet end of the valve upon detection of a predetermined water temperature at the inlet end of the temperature responsive shut-off valve.

According to a further broad aspect of the present invention there is provided a method for preventing the flow of unsafe water from a water holding tank of an electric water heater and into the hot water distribution conduit system associated therewith. The method comprises the steps of:
i) securing a temperature responsive shut-off valve to a hot water supply outlet of the water holding tank of the electrical water heater,
ii) sensing water temperature in the temperature responsive shut-off valve by a temperature sensing actuating element to operate a closure component of the shut-off valve to assume a closed position upon detection a predetermined low unsafe water temperature fed to an inlet end of the shut-off valve to prevent water flow there through and into the hot water distribution conduit, and
iii) displacing the shut-off valve closure component to an open position upon detecting a predetermined safe hot water temperature fed to the inlet end of the shut-off valve.

DESCRIPTION OF THE DRAWINGS

A preferred embodiment of the present invention will now be described with reference to the examples thereof illustrated by the accompanying drawings in which;

FIG. 2A is a simplified fragmented schematic view illustrating the basic mechanism of a thermostatic adjustable valve responsive to temperature change of the water flowing there through;

DESCRIPTION OF THE PREFERRED EMBODIMENT OF THE INVENTION

Figure 1:
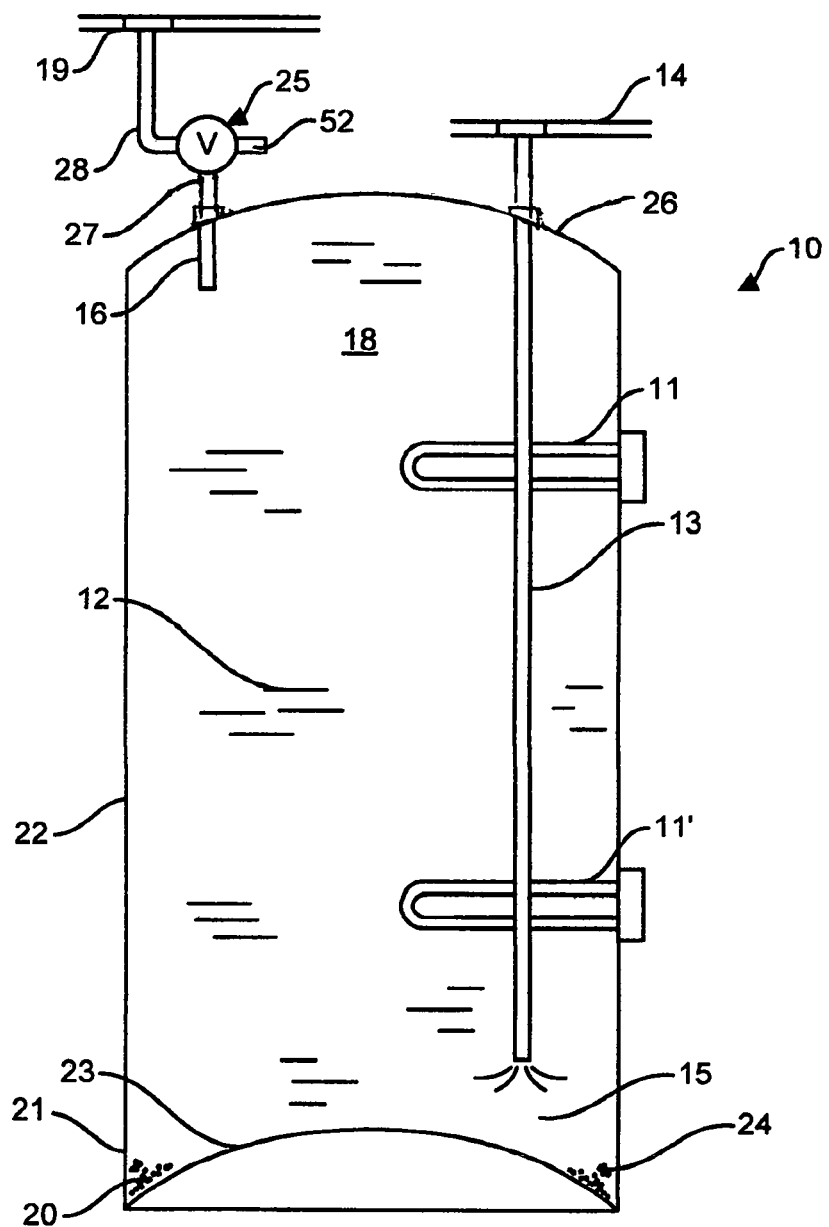
FIG. 1 is a simplified schematic view of the water holding tank of a domestic electric water heater showing a few basic components thereof and a shut-off valve secured to the hot water outlet pipe of the tank to feed hot water into a hot water distribution conduit.
Figure 2A:
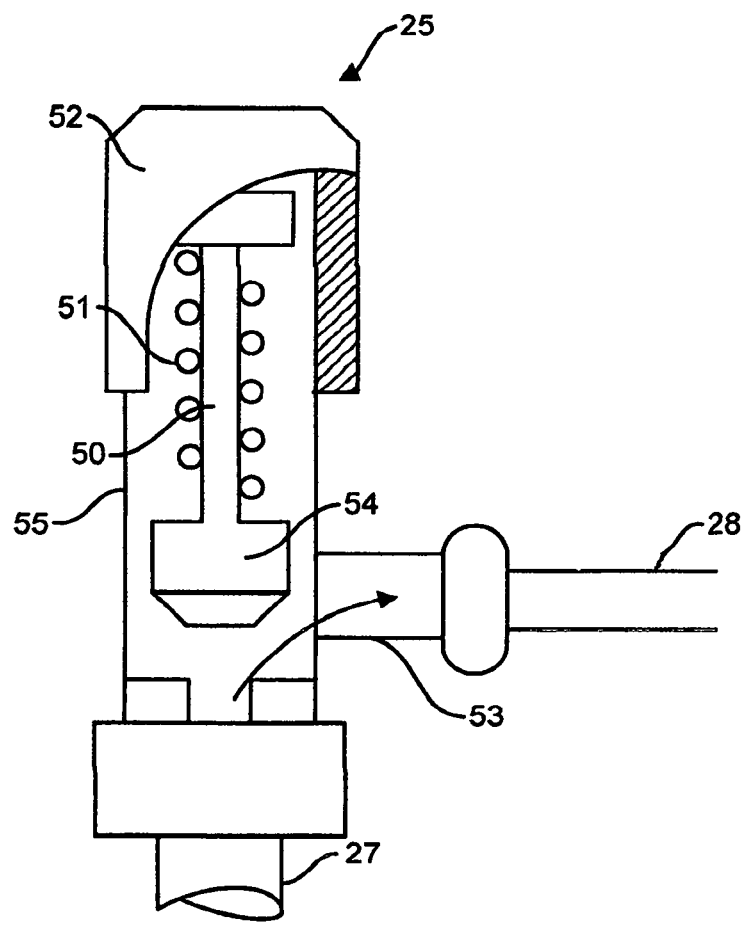

Referring now to the drawings, and more specifically to FIGS. 1 and 2A, there is shown generally at 10 a simplified view of a water holding tank of a domestic electric water heater. As shown, a resistive heating element 11 is mounted in the tank to heat water 12 in an upper portion of the tank 10 and a bottom resistive heating element heats the water in a lower portion of the tank. Of course, the tank 10 may be fitted with more than two resistive heating elements spaced-apart in the tank, as is well known in the art. A water supply conduit 13, commonly referred to as a dip tube 13, feeds domestic water from the water supply conduit 14 to the bottom region 15 of the tank. A hot water supply outlet conduit 16 is fitted to the top wall 17 of the tank 10 to supply hot water from the top region 18 of the tank to a hot water distribution conduit 19 of a hot water supply conduit system.

As previously described, harmful bacteria may develop and propagate in the lowermost area of the tank, such as in the cavitated circumferential area 20 defined between the bottom end portion 21 of the tank side wall 22 and the bottom dome-shaped bottom wall 23 and particularly in the sediment deposits 24 accumulated therein and which constitutes a culture bed for bacteria development when water condition are stagnant for long periods of time and water temperature in that region are favorable, such as when there is no draw of hot water for long periods of time, or if there is malfunction of the heating elements. If there is a constant draw of a large volume of water, such as when filling a bathtub or taking a long shower, etc., the resistive heating elements may not be able to maintain a safe temperature of water, usually 140 degrees Fahrenheit, in the upper region of the tank with the cooler water from the bottom end 15 being drawn up into the tank and fed into the distribution conduit 19. The present invention precludes this risk by the provision of a simple electro-mechanical solution by the connection of thermostatic shut-off valve 25 in the hot water supply outlet conduit 16 exiting the tank top wall 26 of the tank and which is set to close when water temperature therein attains a non-safe temperature. When a predetermined temperature drop is attained, usually due to an excessive draw of hot water from the upper region 18 of the tank, such as when filling a bathtub, the valve 25 automatically closes. A set low temperature value of about 125 degrees Fahrenheit, which is slightly above the temperature where bacteria, such as the *Legionella* bacteria cannot survive, is an ideal temperature setting.

The thermostatic shut-off valve 25 is of a type known in the art and equipped with a temperature responsive element which upon detecting a predetermined water temperature in contact therewith causes the valve to close and to re-open when the water temperature is restored to a normal safe level. As shown in FIG. 2A, the thermostatic valve 25 basically contains an actuator 50 that expands and contracts as the water temperature flowing there against rises and falls. The actuator 50 operates under the tension of a spring 51 and its tension is adjustable by a control knob 52 to close the communication port 53 to the conduit 28 connected to the hot water distribution conduit 19 when the set temperature is attained, in this case an unsafe low temperature value of about 135 degrees Fahrenheit. The spring plunger 54 inside the valve body 55 reacts to close and open the valve communication port 53, thus controlling the flow of hot water into the hot water distribution conduit 19.

Figure 2B:
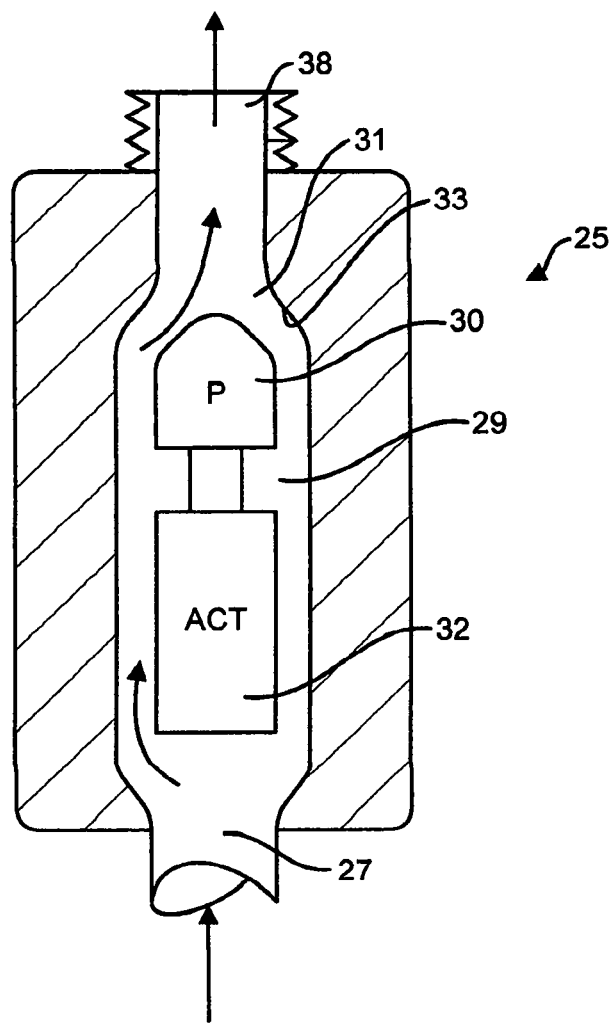
FIG. 2B is another simplified fragmented schematic view illustration of a plunger type valve secured to the hot water outlet conduit of the water heater.

FIG. 2B is a simplified illustration of a plunger type shut-off valve 25. It has an inlet end 27 connected to the hot water supply outlet conduit 16 and an outlet 38 connected to the hot water distribution conduit 19. The valve 25 defines an internal fluid passage 29 in which is displaceably supported a closure component 30 in the form of a plunger to be displaced into and out of an outlet orifice 31 to arrest the flow of water through the fluid passage 29. A temperature responsive or sensing and control mechanism 32 actuates the closure component 30 upon detecting the predetermined water temperature, in this case 125 degrees Fahrenheit.

When the predetermined low temperature is sensed, the mechanism 32 causes the closure component to be displaced against the shoulder 33 surrounding the outlet orifice 31 to cut-off, or preclude the flow, of water through the valve fluid passage 29 and into the hot water distribution conduit 19 preventing the risk of bacteria transfer into the conduit 19. When the water temperature at the inlet end 27 of the valve increases to the predetermined safe temperature above 125 degrees Fahrenheit, the mechanism 32 retracts the closure component to an un-obstructing position, as herein illustrated, reopening the orifice and continuing the safe transfer of hot water into the distribution system. Various types of thermostatic valve structures are known to effect this described automatic operation of cutting off the supply of hot water. Its operation is the reverse of the safety valves associated with water heaters to prevent the supply of excessively hot water into the hot distribution system which could cause scalding.

Figure 3:
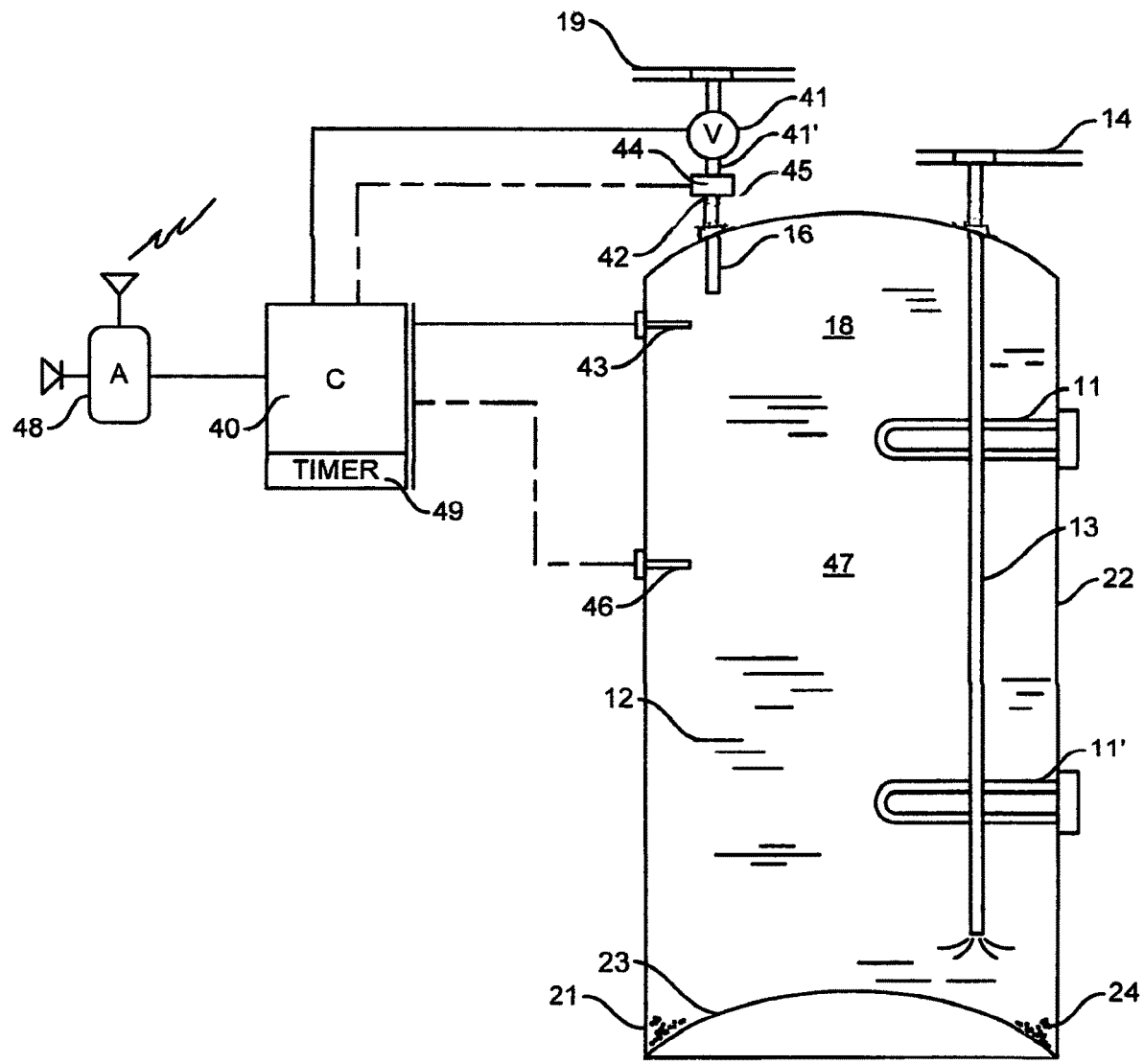
FIG. 3 is a further schematic view, similar to FIG. 1, but illustrating other examples of the shut-off valve control system using a programmable controller.

Referring now to FIG. 3, there is illustrated a further example of the present invention and wherein the temperature sensing and control means is comprised of a programmable controller 40 having a memory in which is stored an inputted programmed function to cause the controller to execute the operation of a standard shut-off valve 41 in response to detected water temperature compared to stored reference temperature values of water in the upper region 18 of the water holding tank 10 which is fed to the inlet end 42 of the control shut-off valve 41. As herein shown, a temperature sensor 43 is secured to the side wall 22 of the tank and extends into the upper region 18 of the water holding tank at a predetermined position relative to the inlet end 16' of the hot water supply outlet conduit 16, The temperature probe or sensor 43 feeds actual temperature signals to the controller 40 indicative of the water temperature detected in the upper region 18 of the water holding tank 10 for comparison to stored reference low temperature value, herein 125 degrees Fahrenheit, which has been inputted in the memory of the computer of the controller.

As shown in FIG. 3, alternatively, a temperature sensor 44 may be secured to the inlet end 42 of the shut-off valve 41 to detect the water temperature in the conduit 45 at the inlet end 41' of the shut-off, valve 41 to send actual temperature signals to the controller 40. The conduit 45 is constructed of a metal, such as copper, which is an excellent heat conducting material, and its temperature is substantially the same as the water flowing there through. The temperature sensor 44 could also be secured to the tank side wall outer surface 22 in the area illustrated where the probe 43 is secured. The temperature of the side wall, which is constructed of steel, also reflects the temperature of the water inside the tank at the location where the sensor is secured.

As also shown in FIG. 3, a further embodiment is comprised by securing a further water temperature sensor 46 to the side wall 22 of the tank at a mid-region of the water holding tank 10 to feed water temperature signals to the controller 40 indicative of water temperature at the mid-region 47. The controller 40 would be programmed to operate the shut-off valve 41 to open when water temperature signals from the mid-region 47 has risen to a predetermined hot water temperature after a closure of the shut-off valve by the controller upon water temperature in the upper region having reached predetermined low temperature value. The large volume of hot water from above the mid-region, as well as hot water being replenished by the operation of the resistive heating elements 11 and 11', would assure a continuous supply of hot water of about 140 degrees Fahrenheit for a good period of time.

Another feature of the controller is that it can be programmed to detect if repetitive valve openings and closing takes place indicating that there is a continuous outflow of hot water in the hot water distribution conduit and automatically shut-off the valve 41 and generate an alarm through an alarm device 48 either audibly or electronically or both, locally or remotely, to signal that a water tap connected to the hot water distribution conduit 19 was left open or that there is a leakage in the conduits of the hot water distribution system.

The controller 40 may also be provided with a timer circuit 49 which is automatically activated when the controller 40 causes the shut-off valve 41 to close upon detection of the predetermined low temperature value, of 125 degrees Fahrenheit as mentioned above. The controller 40 automatically causes the shut-off valve 40 to open after the expiration of a predetermined time delay by timer circuit 49 and at which time delay the water temperature in the upper region of the water holding tank as been calculated to have reached the predetermined hot water temperature of 140 degrees Fahrenheit. This time delay is ascertained by experimentation of the type of water heater in question taking into account tank size and number of resistive heating elements utilized and their power rating.

It is also pointed out that the controller 40 may be programmed to effect a signal sequence of the valve by opening and shutting the valve in a predetermined sequence to cause the hot water supply in the distribution system to pulsate causing the flow of water being dispensed by the user person to pulsate to provide a warning that it is about to run out of hot water from its water heater. Such a water pulsating alarm system is described in our U.S. Pat. No. 10,139,135 issued on Nov. 27, 2018 and entitled 'Automatic Hot Water Pulsating Alarm For Water Heaters'. Such an alarm can be triggered for example upon the sensor 43, 44 detecting a water temperature of 135 degrees Fahrenheit.

The method of the present invention can be briefly summarize, as follows. Firstly, a control shut-off valve 25, 41 is connected to the hot water supply outlet 27, 45 of the water holding tank 10 of a domestic electrical water heater. If the valve is simple thermostatic valve 25, it will cut-off water flow when a set low temperature is detected by the temperature sensing element of the valve and shifting the follow of water to the hot water distribution conduit 19. An alternative controller operated valve system may used to sense water temperature in the upper portion of the water holding tank 10 and to operate a closure component of the shut-off valve 41, to assume a closed position, to prevent water flow there through and into the hot water distribution conduit 19 when water temperature approaches an unsafe temperature which could contain bacteria. The valve is then operated to assume an open position upon detecting a predetermined hot water temperature in the region of the inlet end of the shut-off valve. The method may also comprise the generation by a controller 40 of a water pulsating alarm under certain detected malfunctions or the transmission of an audible or electronic alarm locally or remotely to inform the user person of an alarm situation.

It is within the ambit of the present invention to cover any obvious modification of the examples of the preferred embodiment described herein, provided such modifications fall within the ambit of the present invention as defined by the appended claims.

The invention claimed is:

1. A hot water supply cut-off system for use with an electric water heater to preclude the flow of unsafe water to a hot water distribution conduit system associated with said electric water heater to prevent the risk of bacteria transfer to said hot water distribution conduit, said system comprising an electric water heater having a water holding tank, said water holding tank having a domestic water supply inlet conduit to release water under pressure in a lower portion of said water holding tank, two or more resistive heating elements secured to said water holding tank to heat water in an upper and lower region of said tank, a hot water supply outlet conduit secure to said upper portion of said tank to supply hot water to said hot water distribution conduit, a temperature responsive shut-off valve having an inlet end secured to said hot water supply outlet conduit, said temperature responsive shut-off valve having an outlet end secured to said hot water distribution conduit, said temperature responsive valve having a closure component which automatically closes upon detecting a predetermined low water temperature fed to said inlet end of said valve upon detection of a predetermined water temperature at said inlet end of said temperature responsive shut-off valve, and wherein said temperature responsive valve is controlled by a programmable controller having a memory in which is stored an inputted programmed function to cause said controller to execute the operation of said temperature responsive shut-off valve in response to detected water temperature compared to stored reference temperature values of water in said upper region of said water holding tank and fed to said inlet end of said temperature responsive shut-off valve, and a temperature sensor secured to said upper region of said water holding tank for feeding to said controller said actual temperature signals indicative of said water temperature in said upper region of said water holding tank for comparison to said stored reference temperature value, said controller being further provided with a timer circuit, said controller automatically activating said timer circuit when said controller causes said shut-off valve to close upon detection of said predetermine low temperature value, said controller automatically causing said shut-off valve to open after the expiration of a predetermined time delay by said timer circuit and at which time delay said water temperature in said upper region of said water holding tank is at said predetermined low water temperature.

2. The hot water supply cut-off system as claimed in claim 1 wherein said temperature sensor is comprised of a temperature probe secured to a side wall of said tank and extending therein in said upper region of said tank at a predetermined position relative to an inlet end of said hot water supply outlet conduit.

3. The hot water supply cut-off system as claimed in claim 1 wherein said temperature sensor is secured to one of an outer surface of said water holding tank adjacent said upper region of said water holding tank at a predetermined position, at said hot water supply outlet conduit.

4. The hot water supply cut-off system as claimed in claim 1 wherein there is further provided a further water temperature sensor secured in a mid-region of said water holding tank to feed water temperature signals to said controller indicative of water temperature at said mid-region, said controller operating said shut-off valve to open when water temperature signals from said mid-region has risen to a predetermined hot water temperature after a closure of said shut-off valve by said controller upon water temperature in said upper region having reached said predetermined low temperature value.

5. The hot water supply cut-off system as claimed in claim 1 wherein said predetermined low water temperature is about 125 degrees Fahrenheit.

6. A method for preventing the flow of unsafe water from a water holding tank of an electric water heater and into the hot water distribution conduit system associated there with, said method comprising the steps of:
   i) securing a temperature responsive shut-off valve assembly to a hot water supply outlet of said water holding tank of said electrical water heater, said valve assembly having water temperature sensing and control means incorporated therein,
   ii) sensing a water temperature in said temperature responsive shut-off valve by a temperature sensing actuating element of said water temperature sensing and control means to operate a closure component of said shut-off valve to assume a closed position upon detection of a predetermined low unsafe water temperature fed to an inlet end of said shut-off valve to prevent water flow there through and into said hot water distribution conduit, said shut-off valve assembly having a displaceable plunger component secured to an actuator mechanism operable by said water temperature sensing and control means, and
   iii) displacing said plunger component to obstruct an outlet orifice of said valve upon said water temperature at said inlet end being at said predetermined low water temperature and causing said plunger component to retract from said outlet orifice to an un-obstructing position when said predetermined safe hot water temperature is detected at said inlet end of said plunger valve assembly, and
   iv) generating a hot water pulsating alarm in said hot water distribution conduit system upon said controller having detected a predetermined number of repetitive operations of said shut-off valve indicating that there is a continuous outflow of hot water from said hot water distribution conduit system and which outflow requires to be remedied.

* * * * *